United States Patent [19]
Bloom et al.

[11] 3,899,511
[45] Aug. 12, 1975

[54] PHOTOGRAPHIC PROCESSES AND PRODUCTS EMPLOYING BENZINDOLE PHTHALEINS AS OPTICAL FILTER AGENTS

[75] Inventors: Stanley M. Bloom, Waban; Paulina P. Garcia, Arlington, both of Mass.

[73] Assignee: Polaroid Corporation, Cambridge, Mass.

[22] Filed: Aug. 30, 1973

[21] Appl. No.: 393,133

Related U.S. Application Data

[62] Division of Ser. No. 176,053, Aug. 30, 1971, Pat. No. 3,779,752.

[52] U.S. Cl. ............................................ 260/326.13
[51] Int. Cl.² ...................................... C07D 209/18
[58] Field of Search ........... 260/326.14 R, 326.13 R

[56] References Cited
UNITED STATES PATENTS
3,509,174  4/1970  Lin ............................. 260/326.14 R
3,779,752  12/1973  Bloom et al. ................ 260/326.14 R
3,812,146  5/1974  Farber et al. ............... 260/326.14 R

*Primary Examiner*—Elbert L. Roberts
*Attorney, Agent, or Firm*—Sybil A. Campbell

[57] ABSTRACT

This invention relates to a class of phthalein indicator dyes useful as optical filter agents in photographic processes to protect a selectively exposed photosensitive material from further exposure during processing in the presence of incident light. Such dyes comprise 3,3-disubstituted phthalides and 3,3-disubstituted naphthalides wherein the 3,3 substituents are benzindole radicals.

11 Claims, 1 Drawing Figure

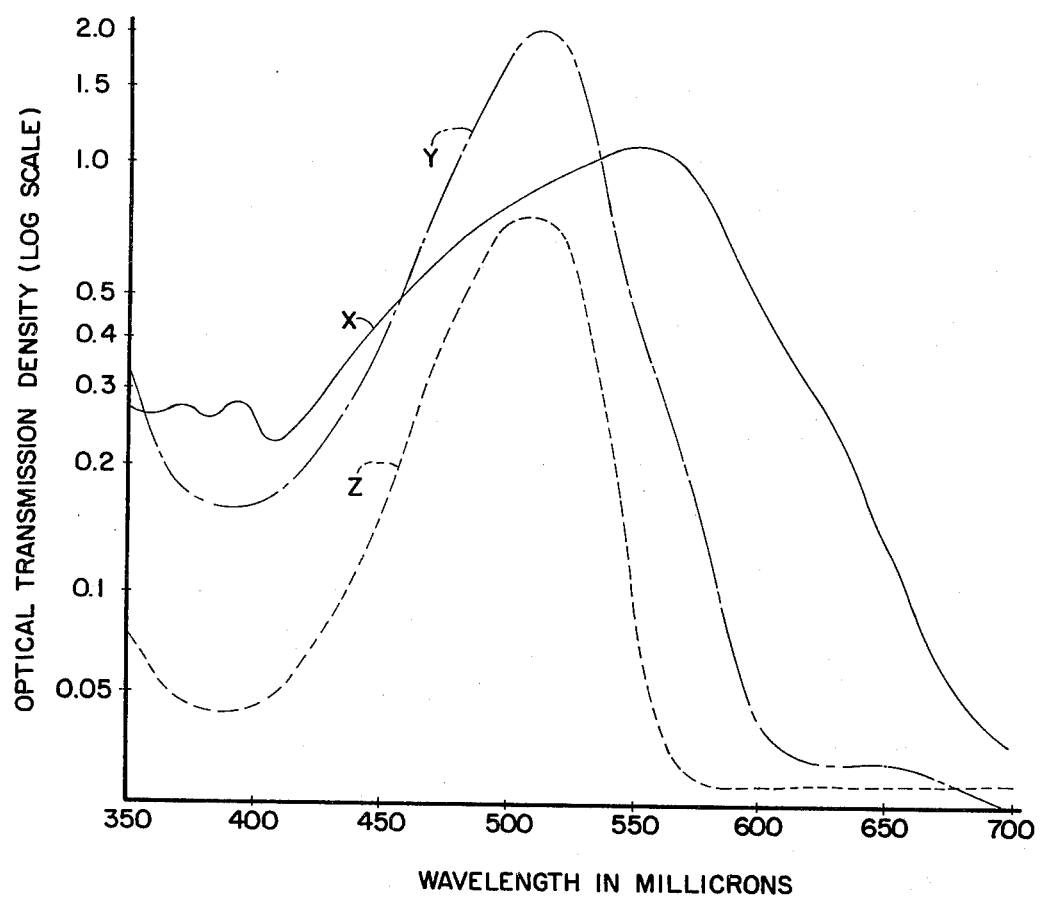

PHOTOGRAPHIC PROCESSES AND PRODUCTS EMPLOYING BENZINDOLE PHTHALEINS AS OPTICAL FILTER AGENTS

This application is a division of application Ser. No. 176,053 filed Aug. 30, 1971, now U.S. Pat. No. 3,779,752.

BACKGROUND OF THE INVENTION

1. Field of the Invention

The present invention relates to novel chemical compounds, and more specifically, it relates to a new class of phthalein indicator dyes and to a method for the preparation thereof. In a particular aspect it relates to certain indole phthaleins useful as optical filter agents in photographic processes for protecting an exposed photosensitive material from post-exposure fogging during development in the presence of extraneous incident light and to such photographic uses.

2. Description of the Prior Art

A number of photographic processes by which images may be developed and viewed within seconds or minutes after exposure have been proposed. Such processes generally employ a processing composition which is suitably distributed between two sheet-like elements, the desired image being carried by one of said sheet-like elements. The resulting images may be in black-and-white, e.g., in silver, or in one or more colors. Processing may be conducted in or outside of a camera. The most useful of such processes are the diffusion transfer processes which have been proposed for forming silver or dye images, and several of these processes have been commercialized. Such processes have in common the feature that the final image is a function of the formation of an image-wise distribution of an image-providing reagent and the diffusion transfer of said distribution to or from the stratum carrying the final image, whether positive or negative.

U.S. Pat. No. 3,415,644 discloses a composite photosensitive structure, particularly adapted for use in reflection type photographic diffusion transfer color processes. This structure comprises a plurality of essential layers including, in sequence, a dimensionally stable opaque layer; one or more silver halide emulsion layers having associated therewith dye image-providing material which is soluble and diffusible, in alkali, at a first pH, as a function of the point-to-point degree of its associated silver halide emulsion's exposure to incident actinic radiation; a polymeric layer adapted to receive solubilized dye image-providing material diffusing thereto; a polymeric layer containing sufficient acidifying capacity to effect reduction of a processing composition from the first pH to a second pH at which the dye image-providing material is substantially nondiffusible; and a dimensionally stable transparent layer. This structure may be exposed to incident actinic radiation and processed by interposing, intermediate the silver halide emulsion layer and the reception layer, an alkaline processing composition providing the first pH and containing a light-reflecting agent, for example, titanium dioxide to provide a white background. The light reflecting agent (referred to in said patent as an "opacifying agent") also performs an opacifying function, i.e., it is effective to mask the developed silver halide emulsions and also acts to protect the photoexposed emulsions from postexposure fogging by light passing through the transparent layer if the photoexposed film unit is removed from the camera before image formation is complete.

In a preferred embodiment, the composite photosensitive structure includes a rupturable container, retaining the alkaline processing composition having the first pH and light-reflecting agent, fixedly positioned extending transverse a leading edge of the composite structure in order to effect, upon application of compressive pressure to the container, discharge of the processing composition intermediate the opposed surfaces of the reception layer and the next adjacent silver halide emulsion.

The liquid processing composition distributed intermediate the reception layer and the silver halide emulsion, permeates the silver halide emulsion layers of the composite photosensitive structure to initiate development of the latent images contained therein resultant from photoexposure. As a consequence of the development of the latent images, dye image-providing material associated with each of the respective silver halide emulsion layers is individually immobilized as a function of the point-to-point degree of the respective silver halide emulsion layer photoexposure, resulting in imagewise distributions of mobile dye image-providing materials adapted to transfer, by diffusion, to the reception layer to provide the desired transfer dye image. Subsequent to substantial dye image formation in the reception layer, a sufficient portion of the ions of the alkaline processing composition transfers, by diffusion, to the polymeric neutralizing layer to effect reduction in the alkalinity of the composite film unit to the second pH at which dye image-providing material is substantially nondiffusible, and further dye image-providing material transfer is thereby substantially obviated.

The transfer dye image is viewed, as a reflection image, through the dimensionally stable transparent layer against the background provided by the reflecting agent, distributed as a component of the processing composition, intermediate the reception layer and next adjacent silver halide emulsion layer. The thus-formed stratum effectively masks residual dye image-providing material retained in association with the developed silver halide emulsion layer subsequent to processing.

In the copending U.S. patent application Ser. No. 786,352 of Edwin H. Land, filed Dec. 23, 1968 now abandoned, and Ser. No. 101,968 filed Dec. 28, 1970, now U.S. Pat. No. 3,647,347, in part a continuation of Ser. No. 786,352, an organic light-absorbing reagent (or optical filter agent), such as a dye, which is present as a light-absorbing species at the first pH and which may be converted to a substantially non-light-absorbing species at the second pH is used in conjunction with the light-reflecting agent to protect the selectively exposed silver halide emulsions from post-exposure fogging when development of the photoexposed emulsions is conducted in the presence of extraneous incident actinic radiation impinging on the transparent layer of the film unit.

In copending U.S. patent application Ser. No. 108,260 filed Jan. 21, 1971, now U.S. Pat. No. 3,702,244 pH-sensitive dyes which contain at least one indole radical bonded by the 2- or 3-position to a ring-closing moiety are disclosed as useful as optical filter agents for absorbing incident radiation actinic to selectively exposed photosensitive materials within a predetermined wavelength range in the shorter wavelength region of the visible spectrum. Certain of the novel indicator dyes disclosed therein, namely, phthaleins derived from benzindoles comprise the subject matter of the present invention together with a method for the preparation of the same.

Conventionally, in the preparation of phthaleins by the condensation of indoles with, for example, phthalic or naphthalic acid, their anhydrides or acid chlorides, the product comprises a di-indol-3-yl phthalide or naphthalide provided the indole selected as the starting material has a free 3-position. As illustrated in Example 3 of copending U.S. patent application Ser. No. 108,277 of Stanley M. Bloom, Alan L. Borror and Paul S. Huyffer filed Jan. 21, 1971, an indole phthalein wherein the indole radicals as bonded by the 3-position to the phthalide ring-closing moiety is obtained by reacting 2-(o-hydroxyphenyl) indole with 3,3-dichlorophthalide.

In these condensations and in other reactions, indoles tend to substitute in the 3-position when possible. As reported by Norland, et al., ibid., 82, 5143 (1960), phthalaldehydic acid and indoles will condense to yield phthalidylindoles and water when the two reactants are fused together at temperatures of 120° to >200°C. If the 3-position of the indole is free, then 3-phthalidylindoles are formed. If the 3-position is blocked or if the 1- and 3-positions are blocked, then 1-phthalidylindoles and 2-phthalidylindoles are formed, respectively. Rees, et al., J. Chem. Soc., pp. 680–687 (1965) observed further that indoles having a free 3-position will react with phthalaldehydic acid in hot benzene to yield the corresponding 3-phthalidyl indoles. Contrary to what would be expected on the basis of the reactions reported previously, it has now been found that benzidoles when reacted with an acid, e.g., hemimellitic acid under Friedel Craft conditions in the presence of an inert, high boiling solvent results unexpectedly in the production of a benzindol-2-yl phthaleins.

SUMMARY OF THE INVENTION

It is the primary object of the present invention to provide a novel class of phthalein indicator dyes derived from benzindoles.

It is another object of the present invention to provide a novel class of phthalein indicator dyes useful as optical filter agents in photographic processes for preventing post-exposure fogging of a selectively exposed phtosensitive material during development in the presence of incident light.

It is a further object of the present invention to provide products, compositions and processes for the development of photosensitive materials in which the novel phthalein indicator dyes are used.

It is yet a further object of the present invention to provide a novel process for the preparation of the above-denoted phthalein dyes.

Other objects of this invention will in part be obvious and will in part appear hereinafter.

The invention accordingly comprises the processes involving the several steps and the relation and order of one or more of such steps with respect to each of the others, and the products and compositions possessing the features, properties and the relation of elements which are exemplified in the following detailed disclosure, and the scope of the application of which will be indicated in the claims.

According to the present invention, there is provided a novel class of phthalein indicator dyes derived from benzindoles which contain two benzindole radicals bonded by the 2-position or two benzindole radicals bonded by the 3-position to a ring-closing moiety selected from a phthalide and a naphthalide. These indicator dyes will be defined with greater particularity hereinafter.

Like phthalein dyes, generally, the dyes of the present invention exhibit reversibly alterable spectral absorption characteristics in response to changes in environmental pH. They have a colored, light-absorbing form in alkaline media at a first pH value above their pKa and a substantially colorless form, i.e., a form which is substantially non-light-absorbing in the visible spectrum at a second pH below their pKa. By pKa is meant the pH at which about 50% of the dye is present in its light-absorbing form and about 50% is present in its non-light-absorbing form.

It will be appreciated that such compounds will find utility in titrations and other analytical procedures where phthalein indicator dyes are commonly employed, for example, to measure changes in pH value as reflected by the change in color of the dye from one color to another or from colored to colorless or vice versa. The indicator dyes of the present invention, however, due to their pKa and spectral absorption characteristics are especially useful as optical filter agents in photographic processes where development of a selectively exposed photosensitive material is performed at least in part outside the confines of a camera in the presence of extraneous incident actinic radiation.

For a fuller understanding of the nature and objects of the invention, reference should be had to the following detailed description taken in connection with the accompanying drawing.

BRIEF DESCRIPTION OF THE DRAWINGS

The FIGURE is a graphic illustration of the spectral absorption characteristics of the benzindole phthalein indicator dyes of the present invention as compared to the spectral absorption characteristics of a simple indole phthalein indicator dye and represents the optical transmission density, i.e., absorbance of the respective dyes measured on a logarithm scale over the wavelength range of 350 nm. to 700 nm. in aqueous alkaline solution at a pH substantially above their pKa.

DESCRIPTION OF THE PREFERRED EMBODIMENTS

According to the present invention, it has been found that benzindole phthaleins, in comparison to indole phthaleins without the benzo[1,2 g]-substituent, exhibit improved spectral absorption characteristics in the shorter wavelength region of the visible spectrum. The benzindole dyes absorb radiation over a wider range in the shorter wavelength region and absorb radiation more effectively over the wider range. Also, the dyes of the present invention exhibit improved pKa characteristics in the respect that they may be rendered colorless at a higher pH in aqueous alkaline photographic processing media. Thus, the dyes may be cleared more rapidly than simple indole phthaleins in photographic processes where it is desired to view image formation soon after the initial stages of development.

It also has been found that benzindol-2-yl phthaleins may be selectively produced under Friedel Crafts conditions by conducting the reaction in the presence of a solvent. In the absence of a solvent, it has been found that benzindol-3-yl phthaleins are selectively produced. As indicated above, such results are quite unexpected since the formation of a benzindol-3-yl phthalein would be expected either with or without a solvent present on the basis of prior observations reported in the literature.

The novel indicator dyes produced in accordance with the present invention may be defined as phthaleins selected from 3,3-disubstituted phthalides and 3,3-disubstituted naphthalides wherein the 3,3 substituents are selected from two benzindol-2-yl radicals and two benzindol-3-yl radicals, said benzindolyl radicals having hydrogen substituted on the heterocyclic nitrogen atom. Typical of the indicator dyes of the present invention are those represented by the formula:

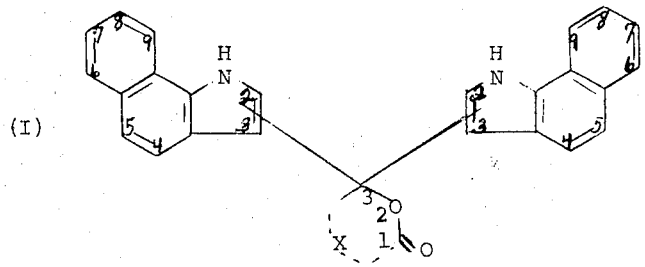

(I)

wherein X represents the atoms necessary to complete a ring-closing moiety selected from a phthalide and a naphthalide.

The indicator dyes defined above and as represented in the foregoing formula may contain substituents on the benzindole radicals and/or ring-closing moiety as may be desired which do not interfere with the function of the dye for its selected ultimate use. Ordinarily, the benzindole radicals when substituted are the same, i.e., they contain the same substituents in the same position.

Typical substituents include branched or straight chain alkyl, such as, methyl, ethyl, isopropyl, n-butyl, t-butyl, hexyl, octyl, dodecyl, hexadecyl, octadecyl and eicosanyl; aryl, such as, phenyl, 2-hydroxyphenyl, and naphthyl; alkaryl, such as benzyl, phenethyl, phenylhexyl, p-octylphenyl, p-dodecylphenyl; alkoxy, such as, methoxy, ethoxy, butoxy, 1-ethoxy-2-($\beta$-ethoxyethoxy), dodecyloxy and octadecyloxy; aryloxy, such as phenoxy, benzyloxy, naphthoxy, alkoxyalkyl, such as methoxyethyl, dodecyloxyethyl; halo such as, fluoro, bromo, and chloro; trifluoralkyl, such as, trifluoromethyl, mono- and bis-trifluoromethyl carbinol; sulfonamido; sulfamoyl; acyl and its derivatives; aminomethyl; amido; sulfonyl; sulfo; cyano; nitro; amino including mono-and disubstituted amino, e.g., N-ethyl amino and N,N'-dimethylamino; carboxy; and hydroxyl.

For use as optical filter agents in photographic processes, such as, diffusion transfer processes employing highly alkaline processing solutions, it may be desirable that the indicator dye selected as the optical filter agent possess a relatively high pKa so that the dye will be in a light-absorbing form during the initial stages of processing and yet may be rendered substantially non-light absorbing within a relatively brief interval as the pH subsequent to substantial image formation is reduced.

Unsubstituted benzindole phthaleins are colored at a relatively high pH and characteristically possess two pKa's, one in the neighborhood of 13 and a lower one in the neighborhood of 11. Where it is desired to raise the lower pKa to substantially the same value as the higher pKa so that the dye may be rendered colorless more rapidly, a hydrogen-bonding group capable of raising the pKa may be substituted in the 9-position of the benzindol-2-yl radicals and in the 2- and/or 9-position of the benzindol-3-yl radicals.

The association of two atoms through hydrogen to form a hydrogen bond between or within molecules is well known. When hydrogen is attached to an electronegative atom, for example, O or N, the resultant bond is polarized. If directed toward another atom (M) with an unshared pair of electrons, the hydrogen acts as a bridge between the atoms (O—H...M) due to the electrostatic attraction to both atoms between which the hydrogen proton can be transferred. In the above compounds, an intramolecular hydrogen bond is formed between the —NH— of the benzindole ring and the adjacent hydrogen-bonding group, i.e., a group containing a heteroatom possessing an active unshared pair of electrons, such as, O, N, S or halogen, e.g., F., which has a free electron pair or a negative charge in basic solution and which is capable of forming a 5-, 6- or 7-membered and preferably a 5- or 6-membered hydrogen-bonded ring with the —NH— of the benzindole ring. Preferably, the heteroatom in the hydrogen-bonding group has attached to it a proton which is more acidic than the proton on the —NH— of the benzindole and ionizes in basic solution to a negative charge. Such groups include, for example, carboxy; hydroxy; ortho-hydroxyphenyl and bis trifluoromethyl carbinol; sulfonamido (—NH—SO$_2$—R wherein R may be alkyl, aryl, alkaryl) and sulfamoyl (—SO$_2$NHR' wherein R' may be alkyl, aryl, alkaryl). Suitable R and R' substituents include branched or straight chain alkyl, e.g., methyl, ethyl, isopropyl, n-butyl, t-butyl, hexyl, octyl, dodecyl, hexadecyl, octadecyl and eicosanyl; aryl, e.g., phenyl and naphthyl; and alkaryl, e.g., benzyl, phenethyl, phenylhexyl, p-octylphenyl and p-dodecylphenyl.

Where it is desired that the indicator dye be substantially immobile or non-diffusible in the processing solution, it may be substituted with a bulky group, such as, a long chain substituent, e.g., dodecyloxy. When a hydrogen-bonding group is present, the immobilizing function may be combined with the hydrogen-bonding function rather than using a separate immobilizing group, for example, by selecting sulfonamido or sulfamoyl groups containing as R or R', a substituent, such as, hexadecyl or p-dodecylphenyl.

Specific examples of indicator dyes within the scope of the present invention are as follows:

(1) 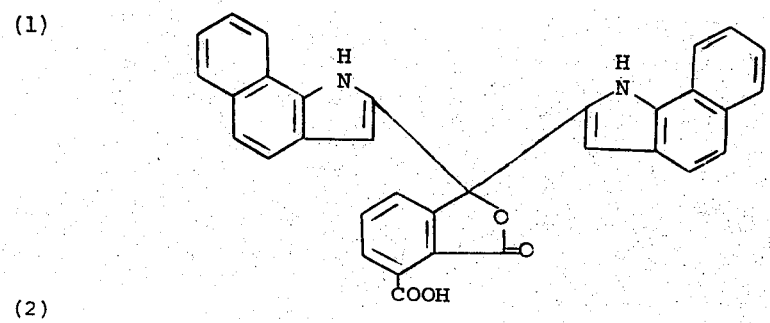
(2) 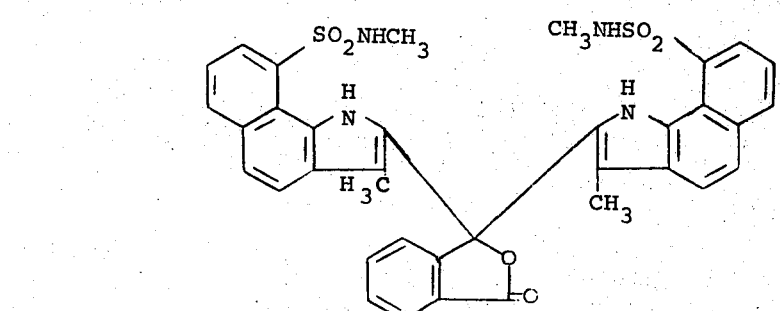
(3) 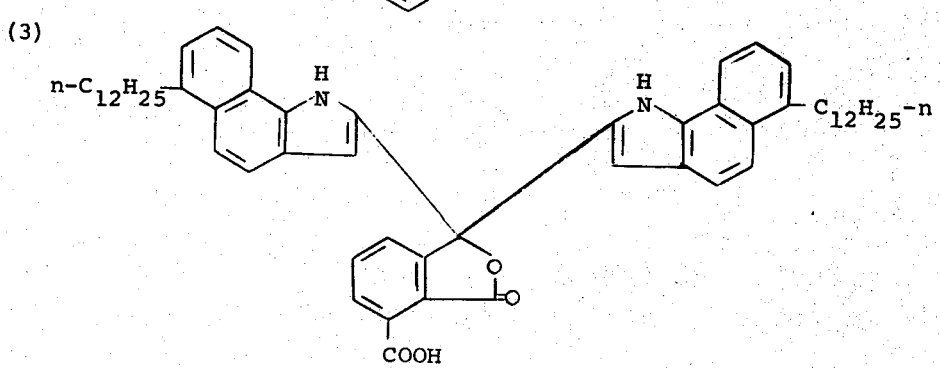
(4) 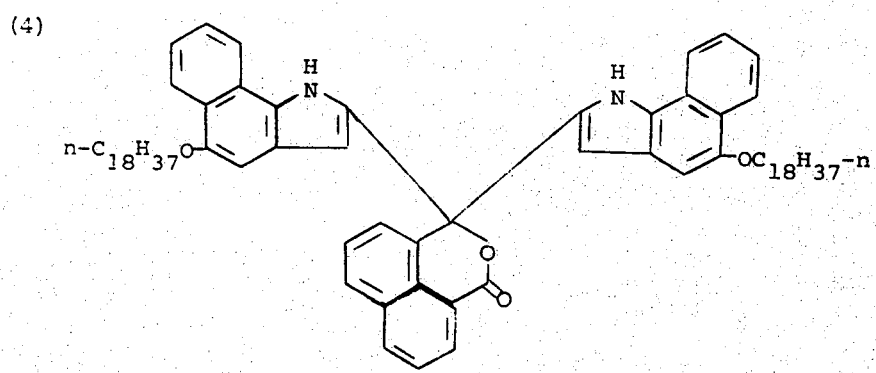
(5) 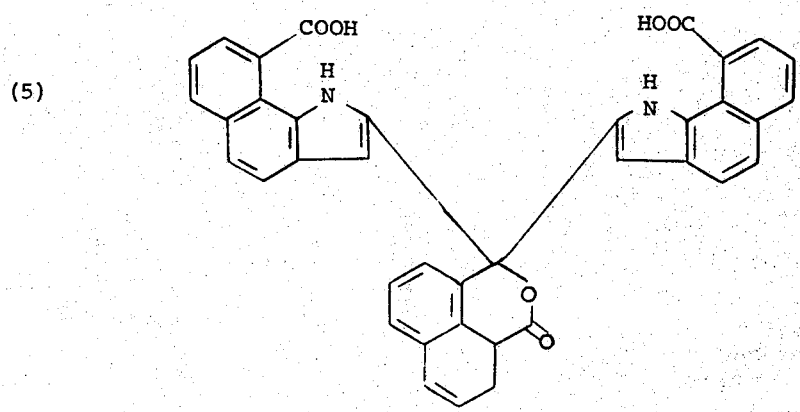

(6) 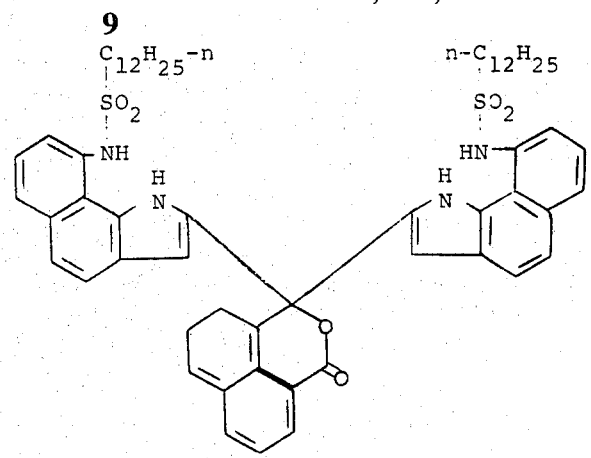
(7) 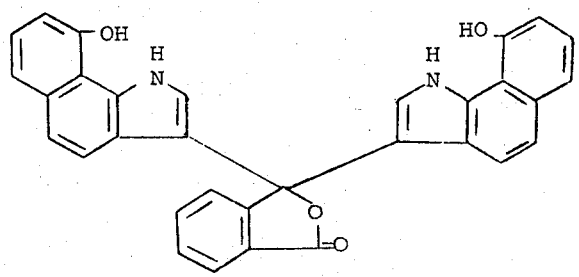
(8) 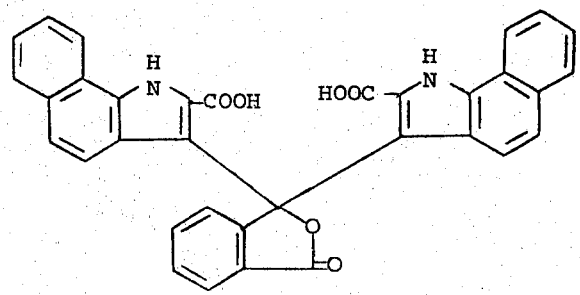
(9) 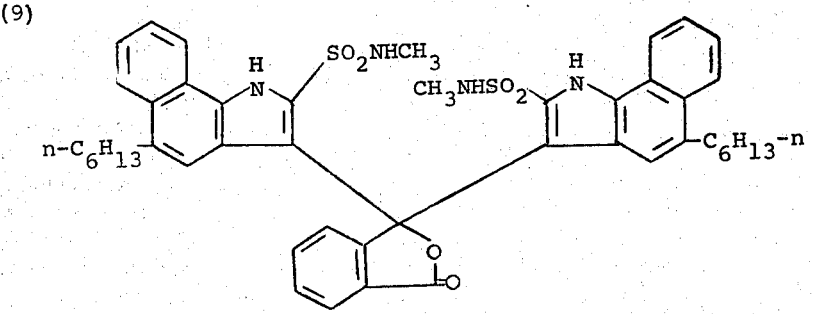

(10)

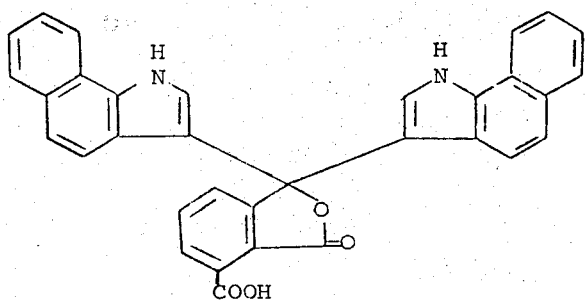

(11)

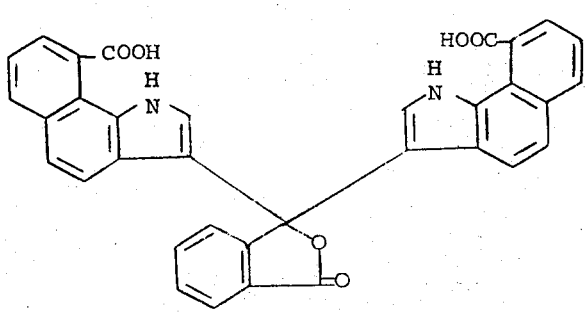

(12)

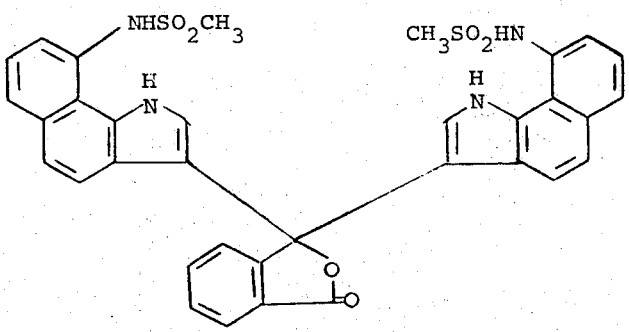

In preparing the novel dyes according to the method of the present invention, the benzindole starting material and the selected acid (or its anhydride or acid chloride) in solution in an inert, high boiling organic solvent are reacted at elevated temperatures in the presence of an acid catalyst, for example, toluene-p-sulfonic acid, phosphorous oxychloride, and preferably, a Lewis acid catalyst. Any of the Lewis acid catalysts conventionally used in the Friedel Crafts reaction may be employed, for example, aluminum chloride, ferric chloride, stannic chloride, boron trifluoride and zinc chloride.

Besides being inert under the reaction conditions and a solvent for both the benzindole and phthalic or naphthalic acid reagent, the inert organic solvent should have a boiling point of at least about 100°C. in order to achieve reasonable product yields. Any inert organic solvent may be used that meets the foregoing criteria, i.e., any inert organic liquid that is capable of dissolving both reactants to form a homogeneous reaction solution and that has a boiling point of at least about 100°C. Particularly useful solvents are toluene and p-xylene. Generally, the reaction is carried out at refluxing temperatures between about 100°–150°C.

The phthalic or naphthalic reagent selected to ultimately form the ring-closing moiety may be the acid, the acid anhydride or the acid chloride. The terms "a phthalic acid" and "a naphthalic acid" as used herein are intended to include the corresponding anhydrides and acid chlorides. These "acids" may be substituted, with solubilizing groups, such as, carboxy, e.g., hemimellitic acid; with long chain substituents to adjust the mobility of the final dye, e.g., sulfonamido containing a long chain alkyl group (—NH—SO$_2$-n—C$_{16}$H$_{33}$); or with other substituents as may be desired.

The benzindole starting material, benzo[1,2 g]indole, may be prepared using any of the conventional reactions available for closing of five-membered heterocyclic rings. A particularly suitable synthesis follows the route to indole derivatives developed by E. Fischer (Fischer indole synthesis) based on the observation that the phenylhydrazone of pyruvic acid may be converted into indole-2-carboxylic acid. As an illustration, benzindole was prepared according to the following reaction sequence; steps (a) through (d).

into 3000 ml. of crushed ice. The precipitate was removed by suction filtration, washed thoroughly with water and recrystallized from ethanol to yield 47.8 g. of (B), melting range 168°–169°C.

c. A mixture of 46.0 g. (0.192 mole) of (B), 33.0 g. (0.59 mole) of potassium hydroxide, and 800 ml. of ethanol was refluxed for 3 hours. After the mixture cooled to room temperature, it was poured into 2 liters of crushed ice and then neutralized with aqueous hydrochloric acid solution. The off-white precipitate was removed by suction filtration, washed with cold 50% aqueous ethanol and dried in vacuo over Drierite at 60°C. to yield 40.0 g. of (C), melting range 224°–225.5°C.

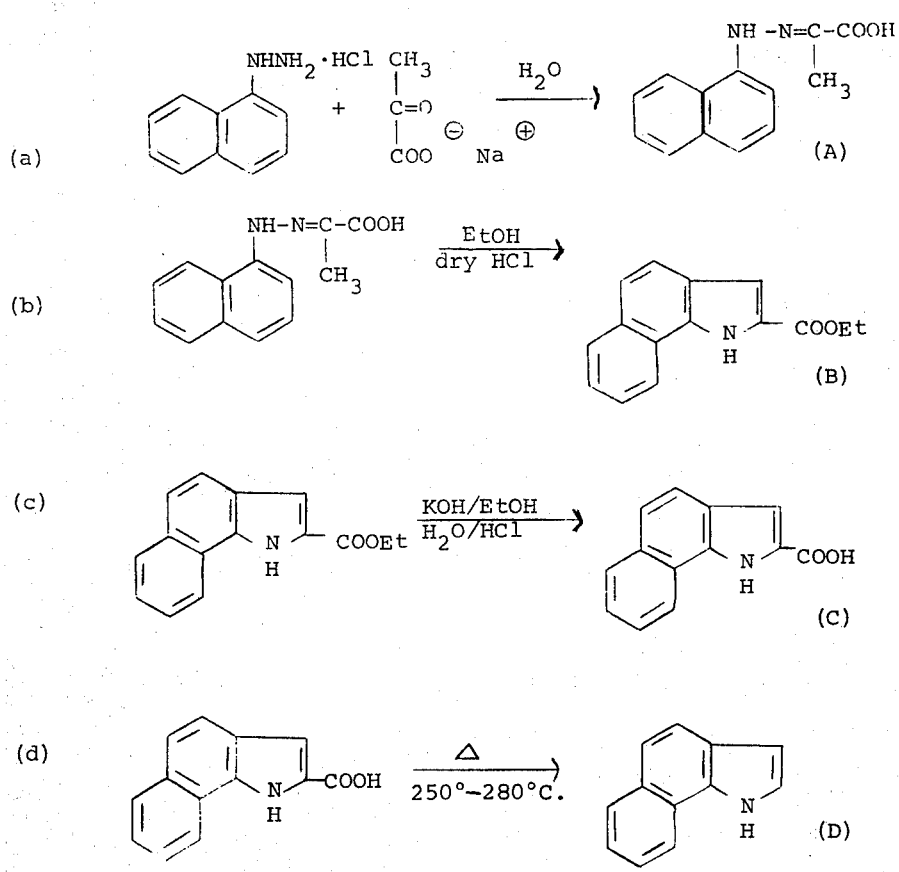

a. To a solution of 25.0 g. (0.23 mole) of sodium pyruvate in 200 ml. of water was added a solution of 50.0 g. (0.26 mole) of α-naphthylhydrazine in 600 ml. of water with vigorous stirring at room temperature. After addition was complete, the mixture was allowed to stand at room temperature for about ½ hour and then chilled. The precipitate was removed by suction filtration, washed thoroughly with water and recrystallized from ethanol to yield 58.0 g. of (A), melting range 164°–165°C.

b. A suspension of 56.0 g. (0.245 mole) of (A) in 1 liter of absolute ethanol was saturated with dry hydrogen chloride gas until ammonium chloride was completely precipitated. The reaction mixture was heated on a steam bath for 15 minutes; allowed to stand at room temperature for about 2 hours; and then poured d. 28.0 g. (0.13 mole) of (C) was placed in a 100 ml. three-necked round bottom flask fitted with a long reflux condenser and a thermometer. The flask was heated to about 230°C. and the resulting melt was gradually heated to 250°–280°C. until all of the carbon dioxide had evolved which took about 45 minutes. At the end of this time, the melt was cooled to room temperature, dissolved in benzene, decolorized with Norit and then allowed to crystallize. Upon crystallization a total of 19.3 g. of (D) was obtained, melting range 169°–170°C.

Benzindoles containing substituents may be produced following the above procedure, or benzindole, itself, may be subsequently substituted with the groups desired in the final dye provided the appropriate position is free to form the 2- or 3- product with the acid reagent. Typical of the substituents that may be used are those enumerated above.

The following Examples are given to further illustrate the present invention and are not intended to limit the scope thereof.

EXAMPLE 1

Preparation of the compound of formula (1):

A mixture of 3.0 g. (0.018 mole) of benzindole, (benzo[1,2 g]indole), 2.0 g. (0.0095 mole) of hemimellitic acid and 300 mg. of freshly fused zinc chloride in 125 ml. of paraxylene was refluxed for about 72 hours, after which the solvent was removed on a flash evaporator. The residue was dissolved in 250 ml. of chloroform and chromatographed on a 34×3.6 cm. florisil column. The first fraction was eluted with chloroform, and the second fraction containing the dye was eluted with a 4:1 mixture of chloroform/methanol. Isolation of the dye by drying in vacuo yielded 100 mg. of pure compound.

As discussed above, it is quite unexpected that the benzindol-2-yl dye is produced under Friedel Craft conditions in the presence of a solvent rather than the benzindol-3-yl dye which would be the expected result either in the presence or in the absence of a solvent. Apparently, in the presence of a solvent, reaction in the 2-position of the benzindole is favored. When the reaction was repeated without p-xylene in an attempt to increase yields, the benzindol-3-yl dye was obtained as demonstrated in Example 2 below.

EXAMPLE 2

Preparation of the compound of formula (10):

A mixture of 0.84 g. (5mm.) of benzindole, 0.5 g. (2.5 mm.) of hemimellitic acid anhydride and 2.0 g. (14.7 mm) of freshly fused zinc chloride was heated on a heating block at 135°–140°C. for about 5 hours, after which it was washed with 5% aqueous acetic acid solution. The residue was dried in vacuo at 60°C. over Drierite to yield 0.54 g. of the title compound (80% by weight pure by sepectroscopy).

The spectral absorption characteristics of the dibenzindol-2-yl 7-carboxyphthalide and of the dibenzindol-3-yl 7-carboxyphthalide produced above are graphically illustrated in the accompanying FIGURE and are designated therein as X and Y, respectively. The curves for X and Y represent the optical transmission density, i.e., absorbance of the respective indicator dyes at a pH substantially above their respective pKa as measured in a 1.6 M solution of sodium hydroxide in aqueous ethanol. Curve Z represents the spectral absorption characteristics of di-indol-3-yl 7-carboxyphthalide, i.e., the optical transmission density as measured under the same conditions. (The latter indole dye was prepared in a conventional manner by refluxing a solution of indole and hemimellitic anhydride in xylene).

From reference to the FIGURE, it can be seen that the benzindol-3-yl dye absorbs radiation over a broader wavelength range than the indol-3-yl dye and is a more effective absorber as evidenced by the greater area under the curve. As compared to the benzindol-3-yl dye, the benzindol-2-yl dye has even a broader absorption spectrum that extends well into the longer wavelength range. Also, it is an especially efficient absorber over the extended range as apparent from the shape of the spectral curve which is comparatively broad and box-like rather than predominantly peaked.

The pKa values measured for the three dyes, X, Y and Z illustrated in the FIGURE were 11.7 and 13.5; 11.0 and 12.5; and 9.1 and 13.3, respectively. Though the values for the higher of the two pKa's for each of the dyes are in substantially the same range, the lower pKa values for both of the benzindole dyes are significantly higher than the lower pKa value for the indole dye. Because of the substantial increase in the lower pKa which brings the two pKa's much closer together, the benzidole dyes may be rendered colorless at a higher pH and thus, may be cleared more rapidly than the simple indole dye. As noted above, this property of clearing relatively rapidly at a comparatively higher pH renders the dyes particularly useful as optical filter agents in photographic processes, e.g., diffusion transfer processes where it is desired to view image formation subsequent to the initial stages of development employing highly alkaline processing solutions.

The pH sensitive indicator dyes of the present invention may be used as optical filter agents in any photographic process including conventional tray processing and diffusion transfer photographic techniques. In such processes, the dye or dyes during development of a selectively exposed photosensitive material will be in a position and in a concentration effective to absorb a given level of non-selective radiation incident on and actinic to the photosensitive material. The dyes may be initially disposed in the film unit, for example, in a layer(s) coextensive with one or both surfaces of the photosensitive layer. Where selective exposure of the photosensitive material is made through a layer containing the indicator dye, then the dyes should be in a non-light-absorbing form until the processing solution is applied. Alternately, the dyes may be initially disposed in the processing composition in their lightabsorbing form, for example, in the developing bath in tray processing or in the layer of processing solution distributed between the photosensitive element and the superposed image-receiving element (or spreader sheet) in diffusion transfer processing. The particular indicator dye or dyes selected should have an absorption spectrum corresponding to the sensitivity of the photosensitive layer, so as to afford protection over the predetermined wavelength range required by the particular photosensitive material employed and should have a pka such that they are in their colored form, i.e., light-absorbing form at the pH at which the photographic process is performed. Most commercially useful photographic processes are performed under alkaline conditions. Diffusion transfer processes, for example, usually employ highly alkaline processing solutions having a pH in excess of 12.

In photographic processes where the optical filter agent is retained in a stratum through which the final image is to be viewed, the color of the indicator dye may be discharged subsequent to image formation by adjusting the pH of the system to a value at which the dye is substantially non-light absorbing in the visible spectrum. In photographic processes performed at an alkaline pH, the optical filter agent, such as, a dye or dyes of the present invention are rendered substantially colorless by reducing the environmental pH. In processes where the optical filter agent is removed or separated from the layer containing the final image or retained in a layer that does not interfere with viewing of the final image, it is unnecessary to convert the indicator dye to its non-light-absorbing form, though the color may be discharged if desired.

The concentration of indicator dye is selected to provide the optical transmission density required, in combination with other layers intermediate the silver halide emulsion layer(s) and the incident radiation, to prevent nonimagewise exposure, i.e., fogging, by incident actinic light during the performance of the particular photographic process. It has been found, by interposing neutral density (carbon containing) filters over a layer of titanium dioxide, that a transmission density of approximately 6.0 from said neutral density filters was effective to prevent fogging of a diffusion transfer multicolor film unit of the type described in said U.S. Pat. no. 3,415,644 having a transparent support layer and an Equivalent ASA Exposure Index of approximately 75, when processed for 1 minute in 10,000 foot candles of color corrected light, a light intensity approximating the intensity of a noon summer sun. The transmission density required to protect such a film unit under the stated conditions may also be expressed in terms of the "system" transmission density of all the layers intermediate the silver halide layer(s) and the incident light; the "system" transmission density required to protect color film units of the aforementioned type and photographic speed has been found to be on the order of 7.0 to 7.2. Lesser levels of optical transmission density would, of course, provide effective protection for shorter processing times, lesser light intensities and/or films having lower exposure indices. The transmission density and the indicator dye concentration necessary to provide the requisite protection from incident light may be readily determined for any photographic process by following the above described procedure or obvious modifications thereof.

Since most commercial photographic processes employ photosensitive materials sensitive to and exposable by actinic radiation throughout the visible spectrum, e.g., black-and-white panchromatic silver halide emulsions and multilayer silver halide emulsion elements, it is preferred to use a second dye(s) in conjunction with the subject dye(s) that has a principal absorption in a second and at least partially different predetermined wavelength range such that the combination of dyes will afford protection from non-selective incident actinic radiation over the range of 400 to 700 nm. The second dye employed may be non-color-changing but preferably, is also pH sensitive, i.e., has reversibly alterable spectral absorption characteristics in response to changes in the environmental pH so that it may be rendered light-absorbing or non-light-absorbing as desired. Illustrative of such dyes are phthaleins derived from phenols, such as, thymol phthalein. The second dye also may be initially present in the film unit or in the processing composition as discussed above either together with or separate from the subject dyes and subsequent to processing may be removed from the film unit or retained within the film structure, provided it is in a form or position such that it does not interfere with viewing of the image produced.

The dyes of the present invention are especially useful as optical filter agents in diffusion transfer processes, for example, those employing composite diffusion transfer photosensitive elements including a film pack or roll wherein superposed photosensitive and image-receiving elements are maintained as a laminate after formation of the final image. Such elements include at least one transparent support to allow viewing of the final image without destroying the structural integrity of the film unit. Preferably, the support carrying the photosensitive layer(s) is opaque and the support carrying the image-receiving layer is transparent and selective photoexposure of the photosensitive layer(s) and viewing of the final image both are effected through the latter support. The final image is viewed as a reflection print, i.e., by reflected light, provided by a reflecting agent initially disposed in the processing composition applied and maintained intermediate the image-receiving and next adjacent photosensitive layer or by a preformed layer of reflecting agent initially positioned intermediate the image-receiving and next adjacent photosensitive layer. It will be understood that a preformed reflecting layer, while it should be capable of masking the photosensitive layer(s) subsequent to image formation, should not interfere with selective photoexposure of the photosensitive material prior to processing.

When utilizing reflection-type composite film units, the indicator dye or dyes employed as the optical filter agent(s) may be positioned initially in a layer of the film unit, e.g., in a layer between the image-receiving and next adjacent photosensitive layer through which photoexposure is effected provided it is incorporated under conditions, i.e., at a pH such that it will not absorb actinic radiation intended to selectively expose the photosensitive material to form a latent image therein. For example, the optical filter agent may be in a layer coated over either the image-receiving layer or the next adjacent photosensitive layer and should remain substantially non-light-absorbing until a processing composition is applied providing a pH at which the indicator dye is capable of being rapidly converted to its light-absorbing form to provide light protection when the film unit is removed from the camera. Rather than being initially disposed in the film unit, the indicator dye may be initially present in the processing composition applied intermediate the image-receiving and next adjacent photosensitive layer subsequent to photoexposure. The dye, when initially disposed in the processing composition, will be in its light-absorbing form.

The dyes selected as optical filter agents should exhibit at the initial pH of the processing, maximum spectral absorption of radiation at the wavelengths to which the film unit's photosensitive silver halide layer or layers are sensitive, and preferably, should be substantially immobile or nondiffusible in the alkaline processing composition in order to achieve optimum efficiency as a radiation filter and to prevent diffusion of filter agent into layers of the film unit where its presence may be undesirable. Recognizing that the filter agent absorption will detract from image-viewing characteristics by contaminating reflecting pigment background, the selected agents should be those exhibiting major spectral absorption at the pH at which processing is effected and minimal absorption at a pH below that which obtains during transfer image formation. Accordingly, the selected optical filter agent or agents should possess a pKa below that of the processing pH and above that of the environmental pH subsequent to transfer image formation.

As discussed previously, the concentration of indicator dye is selected to provide the optical transmission density required, in combination with other layers intermediate the silver halide emulsion layer(s) and the incident radiation, to prevent nonimagewise exposure, i.e., fogging, by incident actinic light during the performance of the particular photographic process. In the processes where the indicator dye or dyes selected as optical filter agents are used in conjunction with a reflecting agent or agents, the optical filter agents and reflecting agents together should possess the optical transmission density necessary to protect the photosensitive material for the particular photographic process. The optimum concentration of optical filter agent(s) or filter agent(s) together with reflecting agent(s) may be readily determined empirically for each photographic system.

While substantially any reflecting agent may be employed for the layer of reflecting agent, either preformed or applied as a component of the processing composition, it is preferred to select an agent that will not interfere with the color integrity of the dye transfer image, as viewed by the observer, and, most preferably, an agent which is aesthetically pleasing to the viewer and does not provide a background detracting from the information content of the image. Particularly desirable reflecting agents will be those providing a white background, for viewing the transfer image, and specifically those conventionally employed to provide background for reflection photographic prints and, especially, those agents possessing the optical properties desired for reflection of incident radiation.

As examples of reflecting agents, mention may be made of barium sulfate, zinc sulfide, titanium dioxide, barium stearate, silver flake, silicates, alumina, zirconium oxide, zirconium acetyl acetate, sodium zirconium sulfate, kaolin, mica, and the like.

Illustrative of the photographic use of the indicator dyes of the present invention as optical filter agents, a photographic film unit may be prepared by coating, in succession, on a gelatin subbed, 4 mil. opaque polyethylene terephthalate film base, the following layers:

1. a layer of the cyan dye developer 1,4-bis-(β-[hydroquinonyl-α-methyl]-ethylamino)-5,8-dihydroxyanthraquinone dispersed in gelatin and coated at a coverage of about 80 mgs./ft.² of dye and about 100 mgs./ft.² of gelatin;

2. a red-sensitive gelatino-silver iodobromide emulsion coated at a coverage of about 225 mgs./ft.² of silver and about 50 mgs./ft.² of gelatin;

3. a layer of the acrylic latex sold by Rohm and Haas Co., Philadelphia, Pennsylvania, U.S.A., under the trade designation AC-61 and polyacrylamide coated at a coverage of about 150 mgs./ft.² of AC-61 and about 5 mgs/ft.² of polyacrylamide;

4. a layer of the magenta dye developer 2-(p-[β-hydroquinonylethyl]-phenylazo)-4-isopropoxy-1-naphthol dispersed in gelatin and coated at a coverage of 70 mgs./ft.² of dye and about 120 mgs./ft.² of gelatin;

5. a green-sensitive gelatino-silver iodobromide emulsion coated at a coverage of about 120 mgs./ft.² of silver and 60 mgs./ft.² of gelatin;

6. a layer comprising the acrylic latex sold by Rohm and Haas Co. under the trade designation B-15 and polyacrylamide coated at a coverage of about 100 mgs./ft.² of B-15 and about 10 mgs./ft.² of polyacrylamide;

7. a layer of the yellow dye developer 4-(p-[β-hydroquinonylethyl]-phenylazo)-3-(N-n-hexyl-carboxamido)-1-phenyl-5-pyrazolone and the auxiliary developer 4'-methylphenyl hydroquinone dispersed in gelatin and coated at a coverage of about 50 mgs./ft.² of dye, about 15 mgs./ft.² of auxiliary developer and 50 mgs./ft.² of gelatin;

8. a blue-sensitive gelatino-silver iodobromide emulsion coated at a coverage of about 75 mgs./ft.² of silver and about 75 mgs./ft.² of gelatin; and 9. a layer of gelatin coated at a coverage of about 50 mgs./ft.² of gelatin.

Then a transparent 4 mil. polyethylene terephthalate film base may be coated, in succession, with the following illustrative layers:

1. a 7:3 mixture, by weight, of polyethylene/maleic acid copolymer and polyvinyl alcohol at a coverage of about 1400 mgs./ft.², to provide a polymeric acid layer;

2. a graft copolymer of acrylamide and diacetone acrylamide on a polyvinyl alcohol backbone in a molar ratio of 1:3.2:1 at a coverage of about 800 mgs./ft.², to provide a polymeric spacer layer; and 3. a 2:1 mixture, by weight, of polyvinyl alcohol and poly-4-vinylpyridine, at a coverage of about 900 mgs./ft.² and including about 20 mgs./ft.² phenyl mercapto tetrazole, to provide a polymeric image-receiving layer.

The two components thus prepared may then be taped together in laminate form, at their respective edges, by means of a pressure-sensitive binding tape extending around, in contact with, and over the edges of the resultant laminate.

A rupturable container comprising an outer layer of lead foil and an inner liner or layer of polyvinyl chloride retaining an aqueous alkaline processing solution comprising:

| | | |
|---|---|---|
| Water | 100 | cc. |
| Potassium hydroxide | 11.2 | gms. |
| Hydroxyethyl cellulose (high viscosity) [commercially available from Hercules Powder Co., Wilmington, Delaware, under the trade name Natrasol 250] | 3.4 | gms. |
| N-phenethyl-α-picolinium bromide | 2.7 | gms. |
| Benzotriazole | 1.15 | gms. |
| Titanium dioxide | 50.0 | gms. |

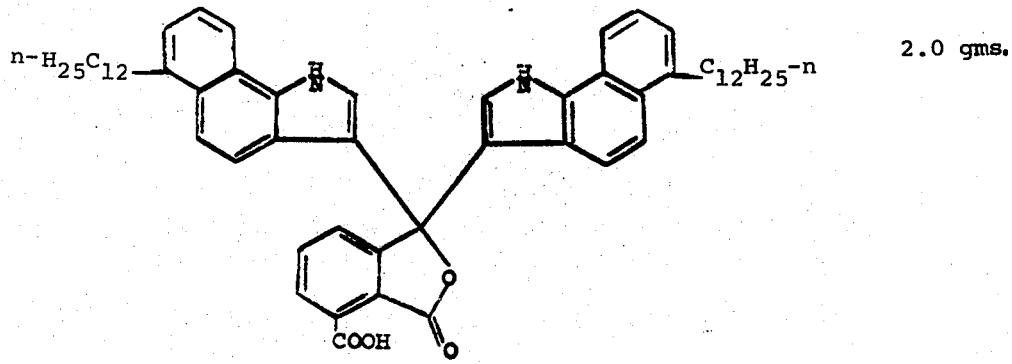

2.0 gms.

0.52 gms.

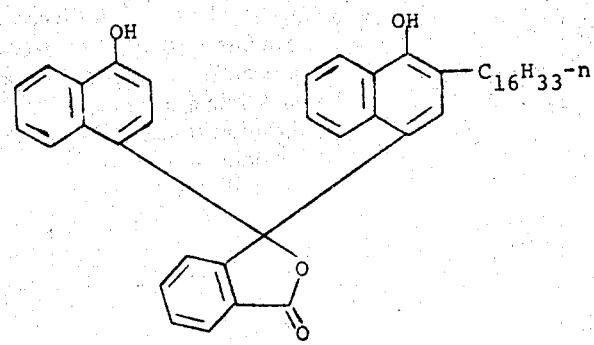

1.18 gms.

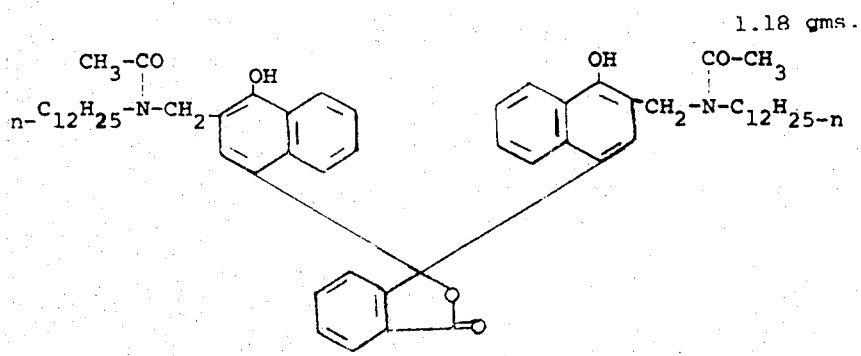

may then be fixedly mounted on the leading edge of each of the laminates, by pressure-sensitive tapes interconnecting the respective containers and laminates, such that, upon application of compressive pressure to a container, its contents may be distributed, upon rupture of the container's marginal seal, between the polymeric image-receiving layer and next adjacent gelatin layer.

The photosensitive composite film units may be exposed through step wedges to selectively filter radiation incident on the transparent polyethylene terephthalate layer and processed by passage of the exposed film units through appropriate pressure-applying members, such as suitably gapped, opposed rolls, to effect rupture of the container and distribution of its contents. During processing, the multicolor dye transfer image formation may be viewed through the transparent polyethylene terephthalate layer against the titanium dioxide background provided by distribution of the pigment containing processing composition between the polymeric image-receiving layer and gelatin layer 9 of the photosensitive component. The film unit may be exposed to incident light and the formation of the image may be viewed upon distribution of the processing composition by reason of the protection against incident radiation afforded the photosensitive silver halide emulsion layers by the optical filter agents and by reason of the effective reflective background afforded by the titanium dioxide.

It will be recognized that the benzindol-2-yl phthaleins of the present invention, such as, the compound prepared in Example 1 may be employed as optical filter agents in photographic processes, for example, as illustrated above.

The film unit detailed above is similar to that shown in FIG. 2 and related FIGS. 3 and 4 of aforementioned copending U.S. patent application Ser. No. 101,968. The negative component of the film unit including the photosensitive strata and associated dye-image-forming material; the positive component including the timing, neutralizing and dyeable layers; and the processing composition including its components, such as, the alkaline material and various addenda are described in detail in application Ser. No. 101,968. For convenience, the specification of this application is specifically incorporated herein.

Besides the above photosensitive element, the dyes of the present invention may be employed in composite photosensitive elements, in general, where the dyeable stratum along with any associated layers may be contained together with the photosensitive strata as a unitary film unit which may be termed an integral negative-positive film unit comprising a negative component including the aforementioned essential layers and a positive component including at least the dyeable stratum in which the color transfer image is to be formed. The essential layers are preferably contained on a transparent dimensionally stable layer or support member positioned closest to the dyeable stratum so that the resulting transfer image is viewable through this transparent layer. Most preferably another dimensionally stable layer which may be transparent or opaque is positioned on the opposed surface of the essential layers so that the aforementioned essential layers are sandwiched or confined between a pair of dimensionally stable layers or support members, at least one of which is transparent to permit viewing therethrough of a color transfer image obtained as a function of development of the exposed film unit in accordance with the known color diffusion transfer processes. It will be appreciated that all of these film units, like the specific one detailed above, may optionally contain other layers performing specific desired functions, e.g., spacer layers, pH-reducing layers, etc.

Examples of such integral negative-positive film units for preparing color transfer images viewable without separation are those described and claimed in aforementioned U.S. Pat. No. 3,415,644 and in U.S. Pat. Nos. 3,415,645, 3,415,646, 3,473,925, and 3,573,043.

In general, the film units of the foregoing description, e.g., those described in the aforementioned patents and/or copending applications, are exposed to form a developable image and thereafter developed by applying the appropriate processing composition to develop exposed silver halide and to form, as a function of development, an imagewise distribution of diffusible dye image-providing material which is transferred, at least in part by diffusion, to the dyeable stratum to impart thereto the desired color transfer image, e.g., a positive color transfer image. Common to all of these systems is the provision of a reflecting layer between the dyeable stratum and the photosensitive strata to mask effectively the latter and to provide a background for viewing the color image contained in the dyeable stratum, whereby this image is viewable without separation, from the other layers or elements of the film unit. As discussed previously, in some embodiments this reflecting layer is provided prior to photoexposure, e.g., as a preformed layer included in the essential layers of the laminar structure comprising the film unit, and in others it is provided at some time thereafter, e.g., by including a suitable light-reflecting agent, for example, a white pigment, such as, titanium dioxide, in the processing composition. As an example of such a preformed layer, mention may be made of that disclosed in the copending applications of Edwin H. Land, Ser. Nos. 846,441, filed July 31, 1969, and 3,645, filed Jan. 19, 1970 now U.S. Pat. Nos. 3,615,421 and 3,620,724, respectively. The reflecting pigment may be generated in situ as is disclosed in the copending applications of Edwin H. Land, Ser. Nos. 43,741 and 43,742, both filed June 5, 1970 and now U.S. Pat. Nos. 3,647,434 and 3,647,435, respectively. In a particularly preferred form, such film units are employed in conjunction with a rupturable container, such as, that used above, containing the processing composition having the light-reflecting agent incorporated therein which container is adapted upon application of pressure of distributing its contents to develop the exposed film unit and to provide the light-reflecting layer.

As noted previously, the photographic use of the dyes of the present invention as optical filter agents to prevent post-exposure fogging of a selectively exposed photosensitive material is not limited to diffusion transfer processes nor to such processes employing composite photosensitive elements. While the use of such dyes in composite multicolor diffusion transfer film units is a particularly preferred embodiment of the present invention, these dyes may be used with equally effective results in any photographic process where it is desired to protect a photosensitive material from incident radiation actinic to the photosensitive material within the wavelength range capable of being absorbed by the dye. For example, the subject dyes may be used in conventional tray photographic processing as a component of the processing bath, or they may be present in a layer coextensive with one or both surfaces of a layer of photosensitive material to be processed using conventional tray procedures, provided that they are non-light-absorbing prior to photoexposure and also subsequent to developing the latent image unless the layer containing the dye is to be removed subsequent to processing. In such procedures, the photoexposed photosensitive material will, of course, be transferred from the camera to the processing bath in the absence of radiation actinic to the material.

The subject dyes also may be employed in diffusion transfer processes where the photosensitive and image-receiving elements are separated subsequent to the formation of a transfer image or where a spreader sheet is separated from the photosensitive element to reveal a final image in the negative. In addition to the composite diffusion transfer structures described above, the subject dyes may be used with composite diffusion transfer film units where the final image is to be viewed by transmitted light. Also they may be used in composite film units specifically adapted, for example, for forming a silver transfer image, for developing a negative silver image by monobath processing, for obtaining an additive color image, and for obtaining a dye image by the silver dye bleach process which structures are described in detail in aforementioned copending U.S. application Ser. No. 101,968, particularly with reference to FIGS. 10 to 13 of the application's drawings.

Although the invention has been discussed in detail throughout employing dye developers, the preferred image-providing materials, it will be readily recognized that other, less preferred, image-providing materials may be substituted in replacement of the preferred dye developers in the practice of the invention. For example, there may be employed dye image-forming materials such as those disclosed in U.S. Pat. Nos. 2,647,049; 2,661,293; 2,698,244; 2,698,798; 2,802,735; 3,148,062; 3,227,550; 3,227,551; 3,227,552; 3,227,554; 3,243,294; 3,330,655; 3,347,671; 3,352,672; 3,364,022; 3,443,939; 3,443,940; 3,443,941; 3,443,943; etc., wherein color diffusion transfer processes are described which employ color coupling techniques comprising, at least in part, reacting one or more color developing agents and one or more color formers or couplers to provide a dye transfer image to a superposed image-receiving layer and those disclosed in U.S. Pat. No. 2,774,668 and 3,087,817, wherein color diffusion transfer processes are described which employ the imagewise differential transfer of complete dyes by the mechanisms therein described to provide a transfer dye image to a contiguous image-receiving layer, and thus including the employment of image-providing materials in whole or in part initially insoluble or nondiffusible as disposed in the film unit which diffuse during processing as a direct or indirect function of exposure.

In view of the foregoing, it will be readily apparent that the subject dyes are useful generally in photographic processes for producing silver, monochromatic and multi-color images using any photosensitive material including conventional and direct positive silver halide emulsions. Depending upon the selected photosensitive material, one or more of the dyes may be used alone or in combination with another optical filter agent, such as another light-absorbing dye, which second dye may be non-color-changing or another pH sensitive dye. If the selected dye or dyes do not possess the desired stability in the processing composition for long term storage therein, they may be initially disposed in the film structure or stored in a double-compartmented pod or in one of two associated pods separate from the processing solution until such time as the pod(s) are ruptured whereupon the dyes are admixed with the processing solution.

Since certain changes may be made in the above product and process without departing from the scope of the invention herein involved, it is intended that all matter contained in the above description or shown in the accompanying drawings shall be interpreted as illustrative and not in a limiting sense.

What is claimed:

1. A symmetrical di-benzindolyl indicator dye having the formula

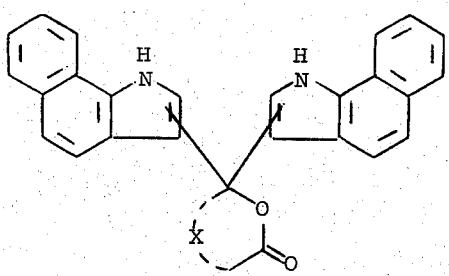

wherein X represents the atoms necessary to complete a ring-closing moiety selected from phthalide, 7-carboxyphthalide and naphthalide, said benzindolyl radicals being selected from benzindol-2-yl radicals and benzindol-3-yl radicals.

2. An indicator dye as defined in claim 1 wherein said benzindolyl radicals are benzindol-2-yl radicals.

3. An indicator dye as defined in claim 1 wherein said benzindolyl radicals are benzindol-3-yl radicals.

4. Di-benzindol-2-yl 7-carboxyphthalide.

5. Di-benzindol-3-yl 7-carboxyphthalide.

6. A method of preparing an indicator dye which comprises reacting benzindole and an acid reagent selected from phthalic acid, hemimellitic acid and naphthalic acid or their anhydrides in the presence of a Lewis acid catalyst at a temperature of at least about 100°C. to yield the corresponding di-benzindol-2-yl phthalide, 7-carboxyphthalide or naphthalide; said benzindole and acid reagent being dissolved in an inert organic solvent having a boiling point of at least about 100°C.

7. A method as defined in claim 6 wherein said catalyst is zinc chloride.

8. A method as defined in claim 6 wherein said solvent is p-xylene.

9. A method as defined in claim 6 wherein said temperature ranges between about 100°C. and 150°C.

10. A method as defined in claim 6 wherein said benzindole is benzo[1,2g]indole.

11. A method as defined in claim 6 wherein said acid reagent is hemimellitic acid.

* * * * *